(12) United States Patent
Joa et al.

(10) Patent No.: US 11,795,926 B2
(45) Date of Patent: Oct. 24, 2023

(54) MOTOR-HYDRAULIC MACHINE UNIT FOR ATTACHMENT TO A HYDRAULIC ASSEMBLY

(71) Applicant: Robert Bosch GmbH, Stuttgart (DE)

(72) Inventors: Benjamin Joa, Gemuenden (DE); Matthias Oppelt, Schonungen (DE); Ruben Ertelt, Glatten (DE)

(73) Assignee: Robert Bosch GmbH, Stuttgart (DE)

( * ) Notice: Subject to any disclaimer, the term of this patent is extended or adjusted under 35 U.S.C. 154(b) by 530 days.

(21) Appl. No.: 16/944,273

(22) Filed: Jul. 31, 2020

(65) Prior Publication Data
US 2021/0048008 A1 Feb. 18, 2021

(30) Foreign Application Priority Data
Aug. 13, 2019 (DE) ..................... 10 2019 212 074.1

(51) Int. Cl.
*F04B 1/128* (2020.01)
*F04B 53/00* (2006.01)
(Continued)

(52) U.S. Cl.
CPC ............ *F04B 1/128* (2013.01); *F04B 1/2078* (2013.01); *F04B 53/001* (2013.01); *F04B 53/16* (2013.01);
(Continued)

(58) Field of Classification Search
CPC .......... F04B 1/128; F04B 1/20; F04B 1/2078; F04B 53/001; F04B 53/16; F04B 1/2085;
(Continued)

(56) References Cited

U.S. PATENT DOCUMENTS 5,231,912 A * 8/1993 Akasaka ............... F04B 1/2085
91/499
5,320,501 A * 6/1994 Langosch ............... F04B 17/03
417/357
(Continued)

FOREIGN PATENT DOCUMENTS

| CN | 108757363 A | * 11/2018 | .............. F04B 1/122 |
| DE | 10 2015 221 318 A1 | 5/2017 | |
| EP | 0155487 | * 9/1985 | ............ F01B 3/0032 |

OTHER PUBLICATIONS

CN 108757363 translation (Year: 2023).*
(Continued)

*Primary Examiner* — Kenneth J Hansen
*Assistant Examiner* — David N Brandt
(74) *Attorney, Agent, or Firm* — Maginot, Moore & Beck LLP

(57) ABSTRACT

A motor-hydraulic machine unit includes an electric motor, a hydraulic machine, and a connection body that has a planar connection surface which delimits first and second working connections. The first and second working connections are each in fluid exchange connection with the hydraulic machine via an assigned first fluid duct in the connection body. The electric motor and the hydraulic machine have a common axis of rotation which is arranged substantially parallel to the connection surface. The hydraulic machine and the electric motor are arranged on opposite sides of the connection body in the direction of the axis of rotation. The connection body is traversed by a drive aperture in the
(Continued)

direction of the axis of rotation. The electric motor and the hydraulic machine are in rotary drive connection in a region of the drive aperture.

12 Claims, 6 Drawing Sheets

(51) Int. Cl.

| | |
|---|---|
| *F04B 1/2078* | (2020.01) |
| *F16H 39/14* | (2006.01) |
| *F04B 53/16* | (2006.01) |
| *F04B 17/03* | (2006.01) |
| *F15B 7/00* | (2006.01) |
| *F16H 61/431* | (2010.01) |
| *F01B 3/00* | (2006.01) |
| *F15B 15/18* | (2006.01) |
| *F03C 1/40* | (2006.01) |
| *F03C 1/06* | (2006.01) |

(52) U.S. Cl.
CPC ............ *F16H 39/14* (2013.01); *F01B 3/0032* (2013.01); *F03C 1/046* (2013.01); *F03C 1/0668* (2013.01); *F03C 1/0686* (2013.01); *F04B 17/03* (2013.01); *F15B 7/006* (2013.01); *F15B 15/18* (2013.01); *F16H 61/431* (2013.01)

(58) Field of Classification Search
CPC ........ F04B 17/03; F16H 39/14; F16H 61/431; F01B 3/0032; F15B 7/006; F15B 15/18; F03C 1/0457; F03C 1/046; F03C 1/0636; F03C 1/0668; F03C 1/0686
See application file for complete search history.

(56) References Cited

U.S. PATENT DOCUMENTS

| | | | | |
|---|---|---|---|---|
| 2004/0126245 | A1* | 7/2004 | Folsom | ................. F04B 1/2078 |
| | | | | 417/269 |
| 2012/0024145 | A1* | 2/2012 | Mori | .................... F03C 1/0615 |
| | | | | 91/468 |
| 2013/0199362 | A1* | 8/2013 | Hoover | ................. F01B 3/0032 |
| | | | | 91/499 |
| 2018/0252209 | A1* | 9/2018 | Kane | ....................... F04B 53/22 |

OTHER PUBLICATIONS

Bosch Rexroth AG, "Regel-und Verstellsysteme HM, HS, HS5 und EO," Data Sheet RD 92076/05.2018, May 1, 2018 (German language document) (60 pages).
Bosch Rexroth AG, "Control systems HM, HS, HS5 and EO," Data Sheet RE 92076/05.2018, May 1, 2018 (English language document corresponding to Data Sheet RD92076/05.2018) (60 pages).

* cited by examiner

MOTOR-HYDRAULIC MACHINE UNIT FOR ATTACHMENT TO A HYDRAULIC ASSEMBLY

This application claims priority under 35 U.S.C. § 119 to patent application no. DE 10 2019 212 074.1, filed on Aug. 13, 2019 in Germany, the disclosure of which is incorporated herein by reference in its entirety.

BACKGROUND

The disclosure relates to a motor-hydraulic machine unit.

DE 10 2015 221 318 A1 discloses a motor-hydraulic machine unit which is intended for attachment to a hydraulic assembly. The motor-hydraulic machine unit comprises a connection body, a hydraulic machine and an electric motor. The hydraulic machine can be a hydraulic pump. The connection body has a connection surface having a first and a second working connection. The motor-hydraulic machine unit is fastened to the hydraulic assembly exclusively via the connection surface. Particularly when the hydraulic machine is operated under high pressure, pressure pulsations occur there which cause the entire motor-hydraulic machine unit to vibrate, resulting in loud operating noises.

An advantage of the present disclosure consists in avoiding such vibrations, with the motor-hydraulic machine unit operating with particularly low noise. The motor-hydraulic machine unit is particularly suitable for high-power hydraulic machines, in particular for axial piston machines.

SUMMARY

It is proposed that the hydraulic machine and the electric motor are arranged on opposite sides of the connection body in the direction of the axis of rotation, wherein the connection body is traversed by a drive aperture in the direction of the axis of rotation, wherein the electric motor and the hydraulic machine are in rotary drive connection in the region of the drive aperture. Consequently, the pressure pulsations occurring in the hydraulic machine can no longer be directly transmitted to the electric motor. Rather, they are channeled via the connection body to the electric motor. Since the connection body is firmly attached to a superordinate assembly, for example a hydraulic assembly, the vibration transmission is thereby substantially impeded. Moreover, the rigidity of the motor-hydraulic machine unit is increased, with the result that their self-resonances no longer lie in the acoustically critical frequency range.

Advantageous developments and improvements of the disclosure are specified in the dependent claims.

There can be provision that the hydraulic machine has a displacement volume which can be adjusted by means of a hydraulic adjusting mechanism, wherein a control valve is provided, wherein the control valve is in fluid exchange connection with the adjustment mechanism via second fluid ducts which are arranged in the connection body, wherein the control valve is attached to the connection body. The control valve preferably comprises a 4/3-way valve. A mechanical feedback of the setting of the displacement volume to the control valve is preferably not provided, with it being possible for the corresponding feedback to be configured electronically by means of position sensors on the swivel cradle. The connection body thus forms a hydraulic adapter via which the control valve is connected to the hydraulic machine. It should be noted here that the control valve is typically attached directly to the hydraulic machine.

There can be provision that the control valve is arranged at an inclination to the axis of rotation in such a way that it does not contact the electric motor. The control valve preferably has a planar lateral surface which is arranged at an inclination to the axis of rotation by an angle which differs from 90°. This results in a particularly compact motor-hydraulic machine unit.

There can be provision that the hydraulic machine comprises a housing part of pot-like design which bears by an open side against the connection body in such a way that the open side is completely covered by the connection body. The connection body thus replaces a housing part of the hydraulic machine. In the case of an axial piston machine of swashplate design, the connection body performs the function of the connection plate.

There can be provision that the connection body has a third fluid duct which forms a leakage connection in the region of the connection surface, wherein it opens out at an opposite end in the region of the open side of said housing part. The leakages of the hydraulic machine can thus be directly channeled to the superordinate assembly. This requires no separate pipeline as would be the case when using the customary leakage connections of a hydraulic machine.

There can be provision that the drive aperture is closed fluidtightly toward the surroundings. Within the context of the present disclosure, the drive aperture forms a portion of the interior of the hydraulic machine in which substantially pressureless pressure fluid is present. This is not intended to exit the motor-hydraulic machine unit. A sealing ring, in particular a radial shaft sealing ring, which seals the first drive shaft with respect to the connection body is preferably arranged within the drive aperture. Said pressure fluid can thus not pass up to the electric motor and exit the motor-hydraulic machine unit there. The pressure fluid is preferably a liquid and most preferably hydraulic oil.

There can be provision that the hydraulic machine is an axial piston machine of swashplate design which comprises a swivel cradle and a cylinder drum, wherein the cylinder drum is arranged between the connection body and the swivel cradle in the direction of the axis of rotation. This ensures that the connection body can replace the connection plate of a customary axial piston machine of oblique axis design. The swivel cradle is a constituent part of the adjusting mechanism explained above.

There can be provision that the hydraulic machine has a first drive shaft, wherein the electric motor has a separate second drive shaft, wherein the first and the second drive shaft are in rotary drive connection directly or via a separate coupling part. The coupling part is preferably arranged within the drive aperture.

There can be provision that the first drive shaft is rotatably mounted with respect to the axis of rotation on a first rotary bearing, wherein the first rotary bearing is received in the connection body. A second rotary bearing arranged at the opposite end of the first drive shaft is preferably received in the pot-like housing part.

There can be provision that the hydraulic machine comprises a cylinder drum having a plurality of cylinder bores in each of which a piston is received in a linearly movable manner, wherein the cylinder drum bears rotatably against a control surface which has a first and a second control kidney which are each connected to an assigned first fluid duct, wherein at least one separate precompression cavity, which can be connected exclusively via a fourth fluid duct to the cylinder bores, is arranged within the connection body and is otherwise closed fluidtightly, wherein the fourth fluid duct opens out on the control surface in the circumferential direction between the first and the second control kidney. The pressure pulsation of the hydraulic machine is reduced by means of the precompression cavity. Its arrangement in the connection body affords a particularly compact motor-hydraulic machine unit. There are preferably provided four separate precompression cavities which have substantially the same volume, wherein they are each assigned a separate fourth fluid duct. The control surface can be arranged on a separate control plate, wherein the fourth fluid duct extends in the control plate in certain portions.

There can be provision that the connection body has a first and a second plate-like portion which are spaced apart from one another in the direction of the axis of rotation, wherein they are oriented perpendicular to the axis of rotation, wherein the electric motor is fastened to the first plate-like portion, wherein the hydraulic machine is fastened to the second plate-like portion, wherein the first and the second plate-like portion are connected to one another in one piece via a tube-like portion, wherein the tube-like portion delimits the drive aperture. This affords a rigid and at the same time material-saving construction of the connection body. At the same time, sufficient installation space for the above-explained fluid ducts and precompression cavities is present. The first and the second plate-like portion are preferably arranged on the end side of the connection body in the direction of the axis of rotation.

There can be provision that at least one stiffening rib is arranged on the outside of the tube-like portion and connects the first and the second plate-like portion and the tube-like portion to one another in one piece, wherein the stiffening rib extends parallel to, or at an inclination of at most 45° to, the connection surface. Two stiffening ribs which are mirror-symmetrical with respect to a plane of symmetry are preferably provided, wherein the plane of symmetry is arranged perpendicular to the connection surface, wherein it contains the axis of rotation. In the region of the second plate-like portion, the stiffening rib is preferably arranged at the height of the axis of rotation with respect to the connection surface. Toward the first plate-like portion, it is preferably inclined away from the connection surface. The stiffening rib allows the vibration tendency of the motor-hydraulic machine unit to be considerably minimized without appreciable use of material being necessary for this purpose.

There can be provision that the connection surface is formed by a third plate-like portion which connects the first and the second plate-like portion and the tube-like portion to one another in one piece. The connection surface is configured transversely to the axis of rotation to be preferably at least 20% larger than the corresponding transverse dimension of the hydraulic machine. The second and the third plate-like portion are configured to be accordingly large. The correspondingly large connection surface affords a rigid connection toward the superordinate assembly, with the result that the vibration tendency is minimized.

It will be understood that the features stated above and those still to be explained below can be used not only in the respectively specified combination, but also in other combinations or in isolation without departing from the scope of the present disclosure.

BRIEF DESCRIPTION OF THE DRAWINGS

The disclosure will be explained in more detail below with reference to the appended drawings, in which.

DETAILED DESCRIPTION

Figure 1:
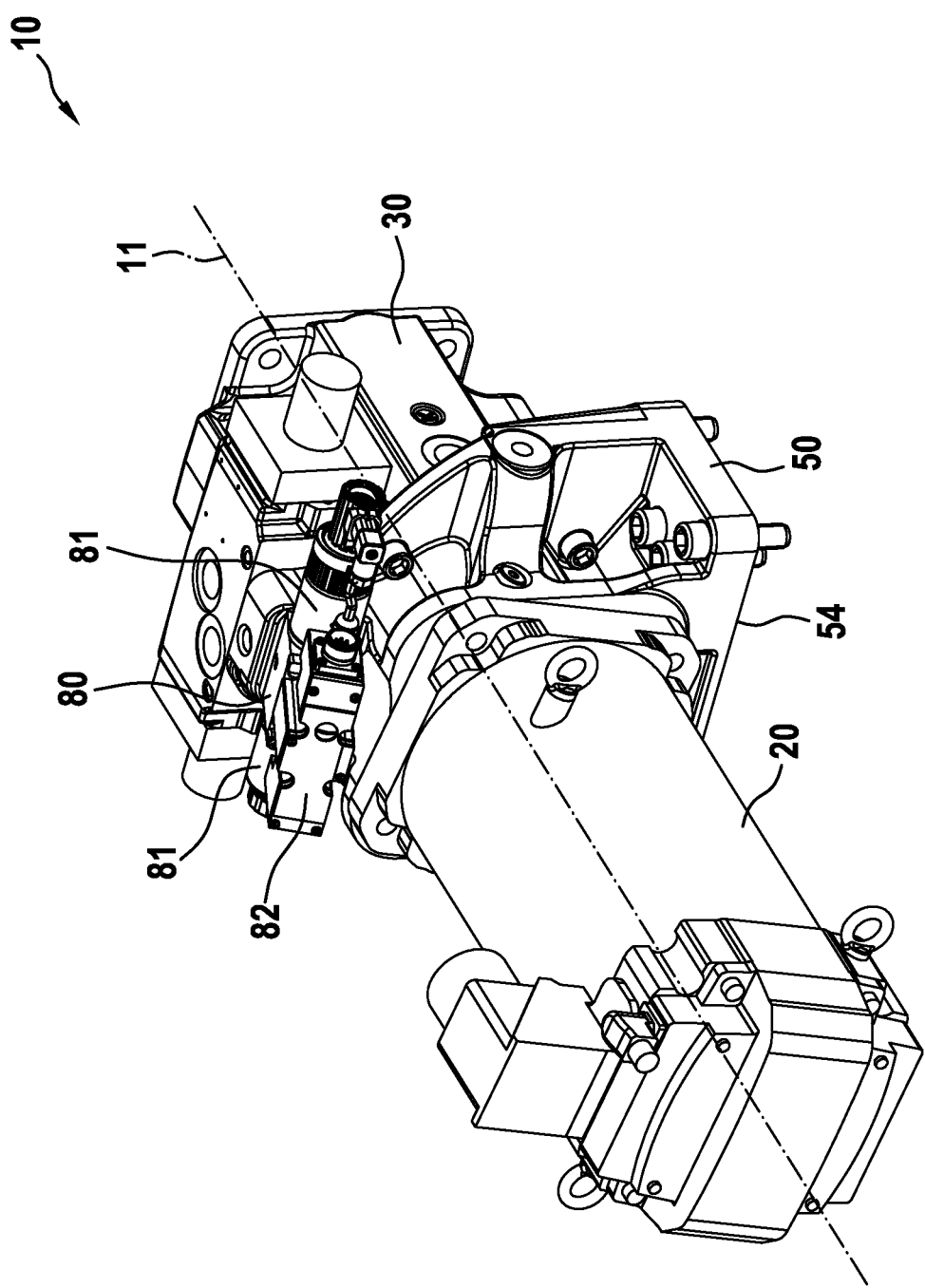
FIG. 1 shows a perspective view of a motor-hydraulic machine unit according to the disclosure.

FIG. 1 shows a perspective view of a motor-hydraulic machine unit 10 according to the disclosure. The motor-hydraulic machine unit 10 comprises an electric motor 20 and a hydraulic machine 30 which have a common axis of rotation 11. With respect to the axis of rotation 11, a separate connection body 50 is arranged between the electric motor 20 and the hydraulic machine 30. The electric motor 20 and the hydraulic machine 30 are fixedly connected, in particular bolted, to the connection body 50. The connection body 50 has a planar connection surface 54 via which it can be fixedly attached to a superordinate assembly, in particular a hydraulic assembly (not shown). All that is required for this purpose is for the connection body 50 to be bolted to the superordinate assembly. Further fastening or piping operations are generally not required.

The electric motor 20 can be selected to have substantially any desired design. The present figures illustrate an electric motor which can be mounted without further adapter parts. However, it is equally thoroughly conceivable that a separate adapter part is arranged in each case between the first and the second drive shaft (Nos. 31; 22 in FIG. 2) and/or between the housing of the electric motor 20 and the connection body 50 and is suitably configured for the selected electric motor 20.

Moreover, a separate control valve 80 is attached to the connection body 50. This can be for example one of the valves which are known from the datasheet which was retrievable on 24 Jul. 2019 under the Internet address https://www.boschrexroth.com/various/utilities/mediadirectory/download/index.jsp?object_nr-RD92076. These control valves each comprise a 4/3-way valve by means of which the double-acting actuating cylinder 8 (No. 37 in FIG. 2) of the hydraulic machine 30 can be adjusted. A mechanical feedback of the position of the actuating piston to the control valve 80 is preferably not provided, with it being possible for the corresponding feedback to be configured electronically by means of position sensors on the swivel cradle (No. 35 in FIG. 2) and an electromagnetic actuator 81 on the control valve 80. The control valve 80 can be equipped with a subsidiary control device 82 to which the electromagnetic actuator 81 and said position sensors can be connected.

Figure 2:
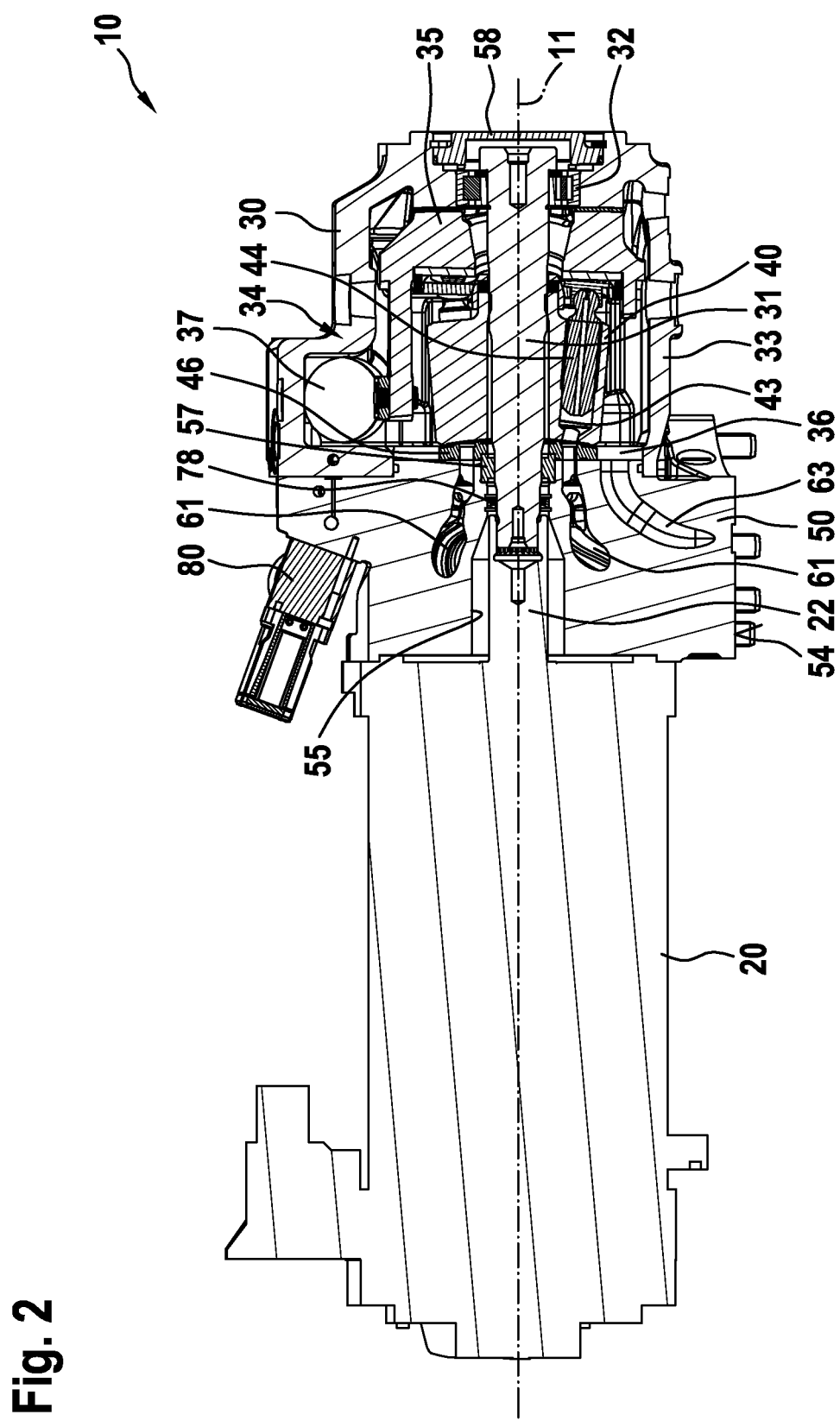
FIG. 2 shows a longitudinal section of the motor-hydraulic machine unit according to FIG. 1.

FIG. 2 shows a longitudinal section of the motor-hydraulic machine unit 10 according to FIG. 1. The hydraulic machine 30 is an axial piston machine of swashplate design. The corresponding cylinder drum 40 is received on a first drive shaft 31 in a rotationally fixed manner. The first drive shaft 31 is rotatably mounted with respect to the axis of rotation 11 by means of a first and a second rotary bearing 57; 32. The first rotary bearing 57 is received in the connection body 50 according to the disclosure, wherein the second rotary bearing 32 is received in a housing part 33 of pot-like design. In the region of the second rotary bearing 32, the housing part is closed by a separate cover 58. It is at this point in customary axial piston machines that the rotary drive connection between electric motor and hydraulic machine occurs, with this connection having been shifted according to the disclosure into the connection body. A sealing ring, in particular a radial shaft sealing ring, is arranged between the first drive shaft 31 and the connection body 50 in the drive aperture 55. This sealing ring is arranged toward the electric motor 20 next to the first rotary bearing 57.

The housing part 33 bears by an open side 36 against the connection body 50, with the result that the open side 36 is completely covered by the connection body 50 in a fluidtight manner. The cylinder drum 40 bears at its end side against the connection body 50 via a control plate 46. At the end of the cylinder drum 40 that is directed away from the connection body 50 there is arranged the swivel cradle 35 which is a constituent part of an adjusting mechanism 34 by means of which the displacement volume of the hydraulic machine 30 can be adjusted. The adjusting mechanism 34 comprises an actuating cylinder 37 which is coupled in movement to the swivel cradle 35. In the present case, the actuating cylinder 37 is configured as a double-acting cylinder. The displacement volume is preferably adjustable beyond zero, with the result that the throughflow direction of the hydraulic machine 30 is reversible without the drive direction of rotation thereof changing. In the cylinder drum 40, a plurality of cylinder bores 43 are arranged in a uniformly distributed manner around the axis of rotation 11. A piston 44 is received in a linearly moveable manner in each of these cylinder bores. The pistons 44 are coupled in movement to the swivel cradle 35 in such a way that a rotation of the cylinder drum is accompanied by a fluid flow between the first and the second working connection (Nos. 51; 52 in FIG. 3).

The connection body 50 is traversed by a drive aperture 55 in the direction of the axis of rotation 11, wherein the rotational coupling between the first drive shaft 31 of the hydraulic machine 30 and the second drive shaft 22 of the electric motor 20 occurs in the region of the drive aperture 55. In the present case, this takes place by means of multiple splining. However, it is also conceivable that a separate coupling is arranged between the first and the second drive shaft 31; 22. It should also be pointed out that the inner structure of the electric motor 20, which is known to a person skilled in the art, is not illustrated in FIG. 2, with instead a continuously hatched area being illustrated.

In FIG. 2 there can further be seen the two first fluid ducts 61 and the third fluid duct 63 in the connection body 50, which will be discussed in more detail below. The connection surface 54 of the connection body 50 is of planar design, with it being arranged parallel to the axis of rotation 11.

Figure 3:
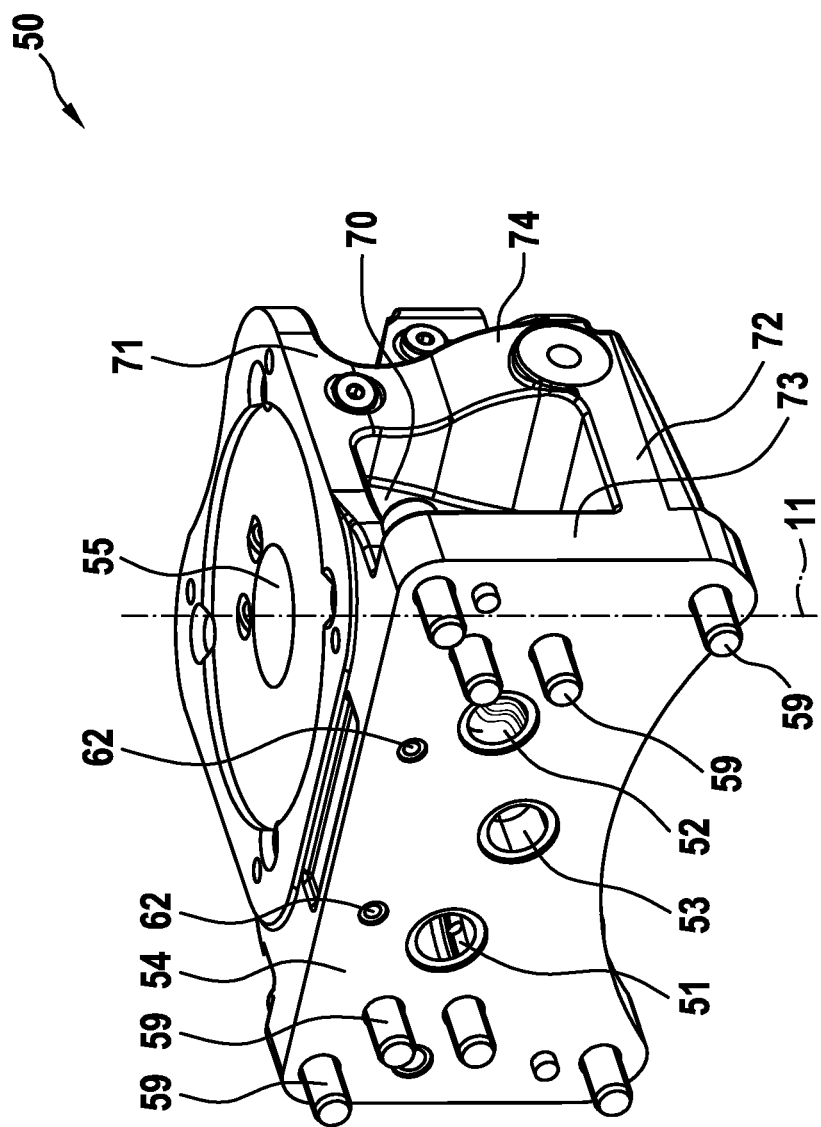
FIG. 3 shows a perspective view of the connection body from the connection surface.

FIG. 3 shows a perspective view of the connection body 50 from the connection surface 54. The connection body 50 comprises a first and a second plate-like portion 71; 72 which are each oriented perpendicular to the axis of rotation 11, wherein they are spaced apart in the direction of the axis of rotation 11. The first plate-like portion 71 is configured in the manner of a flange, with the electric motor (No. 20 in FIG. 1) being fastened there. The drive aperture 55 opens out approximately in the center. The second plate-like portion 72 is likewise configured in the manner of a flange, with the hydraulic machine 30 being fastened there.

It is known that hydraulic machines 30 have a pressure pulsation. This can excite the electric motor 20 quite considerably to vibrate. The configuration of the connection body 50 that is shown is optimized to the effect that, with a combination of minimum material outlay and minimum space requirement, the aforementioned vibrations can be minimized to such an extent that they cause no disturbance in practice.

The connection surface 54 is arranged on a third plate-like portion 73 which is oriented parallel to the axis of rotation 11. Transversely to the axis of rotation 11, the connection surface 54 is configured to be considerably larger than the dimensions of the electric motor 20 and of the hydraulic machine 30 would require. This achieves a particularly rigid connection between connection body 50 and superordinate assembly. In each of the four corner regions of the substantially rectangular connection surface 54 there is a arranged a screw bolt 59 via which the third plate-like portion 73 is bolted to the superordinate assembly. In the interior of the connection surface 54 there are moreover arranged four further screw bolts 59 in order to further stiffen the corresponding connection. These are arranged in the vicinity of the first and the second working connection 51; 52 in order to prevent leakages occurring there.

Within the connection surface 54 there are arranged a first and a second working connection 51; 52 which each lead via an assigned first fluid duct (No. 61 in FIGS. 4 and 5) to the second plate-like portion 72. Also arranged there is a leakage connection 53 which leads via a third fluid duct (No. 63 in FIGS. 4 and 5) to the second plate-like portion 72. Two second fluid ducts 62 to the control valve (No. 80 in FIG. 1) also open out within the planar connection surface 54. A separate control oil supply and a separate control oil return are provided thereby.

Furthermore, attention should be drawn to the stiffening rib 74 which connects the first and the second plate-like portion 71; 72 and the tube-like portion 70 to one another in one piece. In each case such a stiffening rib 74 is arranged transversely to the axis of rotation 11 on both opposite sides of the connection body 50. The stiffening rib 74 extends approximately at an angle of 20° at an inclination to the connection surface 54. It was possible by means of FEM calculations to demonstrate that an optimum stiffening action results thereby. The tube-like portion 70 surrounds the drive aperture 55.

Figure 4:
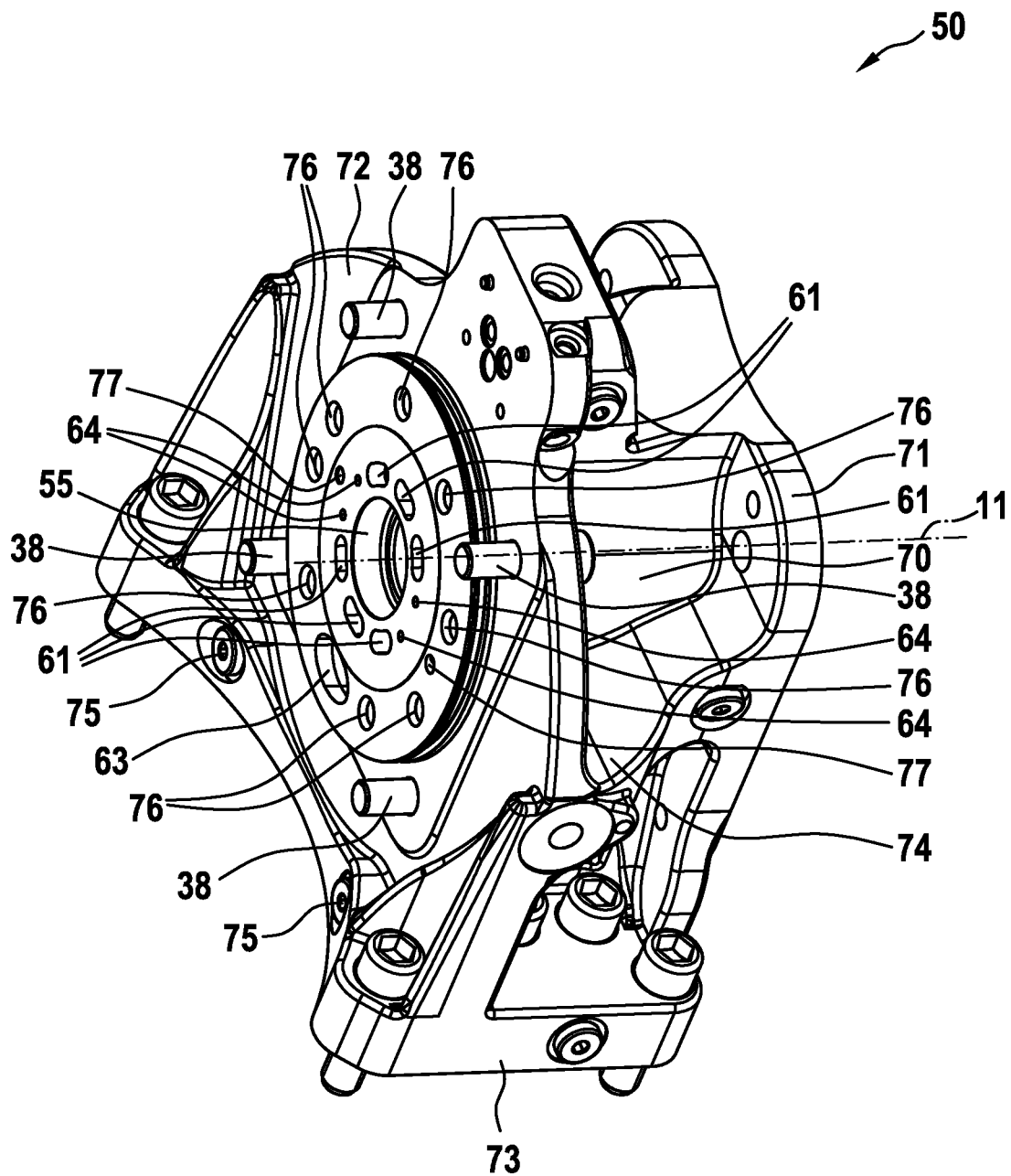
FIG. 4 shows a further perspective view of the connection body from the hydraulic machine.

FIG. 4 shows a further perspective view of the connection body 40 from the hydraulic machine (No. 30 in FIG. 1). In the present case, the hydraulic machine is fastened to the second plate-like portion 72 by way of four screw bolts 38. The arrangement of these screw bolts 38 shows the space requirement which is necessary for fastening the housing part (No. 33 in FIG. 2). In relation thereto, the second plate-like portion has been considerably increased. It can also be seen that the stiffening rib 74 is led up to the outer edge of the second plate-like portion 72. This ensures that the vibrations caused by the hydraulic machine are primarily rigidly supported on the superordinate assembly, with it being the case that they are barely transferred to the electric motor.

It can further be seen in FIG. 4 that the two first fluid ducts 61 each have three mouth openings. The pressure resistance of the first fluid ducts 61 is increased as a result. Since both first fluid ducts 61 are correspondingly configured, both working connections can be used as high-pressure connection.

Figure 5:
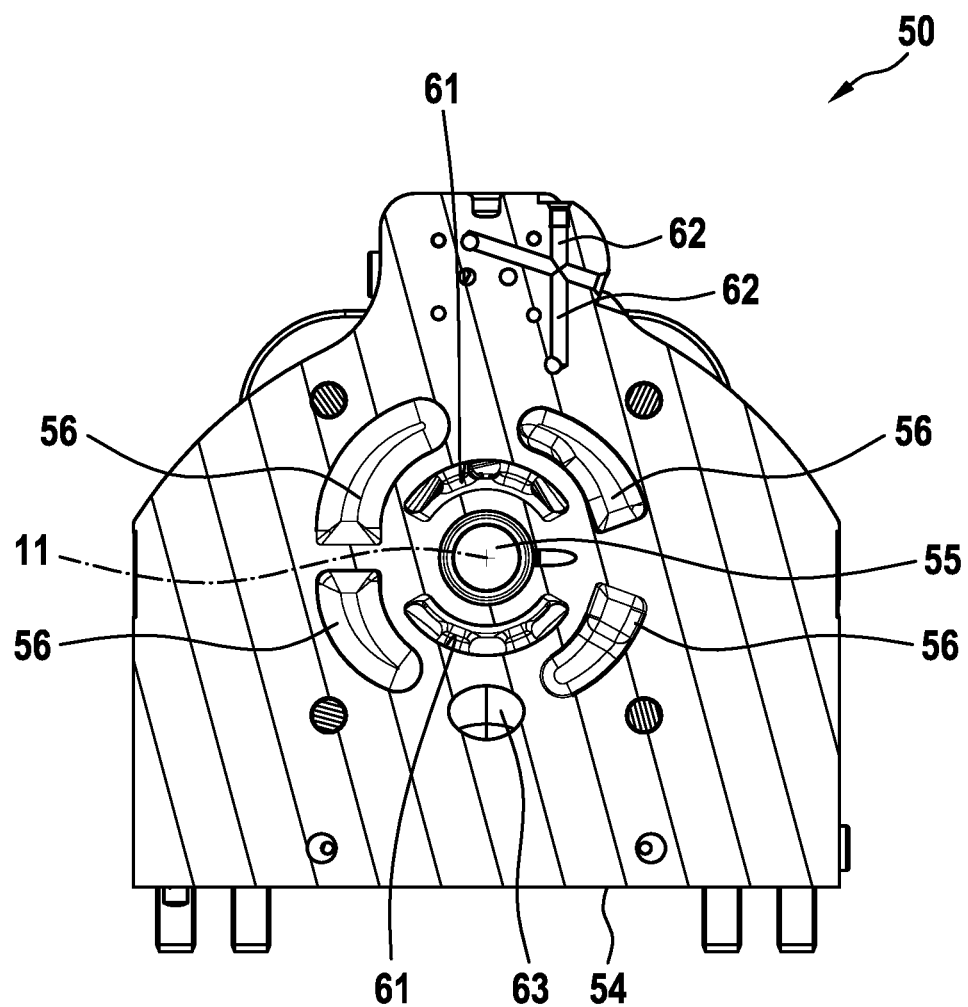
FIG. 5 shows a sectional view of the connection body, wherein the section plane extends perpendicular to the axis of rotation through the precompression cavities.

In the circumferential direction between the two first fluid ducts 61 there are arranged a total of four fourth fluid ducts 64 which each lead parallel to the axis of rotation to an assigned precompression cavity (No. 56 in FIG. 5). Attention should be drawn at this point to fluidtightly closed auxiliary bores 76 which serve for the production of the precompression cavities in the casting process. The corresponding mold cores are held in the desired position by way of the auxiliary bores 76. The rotary position of the control plate (No. 46 in FIG. 2) is secured in a form-fitting manner by means of the aligning bore 77.

Moreover, a respective sensor bore 75 for receiving a pressure sensor is arranged in the third plate-like portion 73 for each working connection. In the present case, the two sensor bores 75 are closed fluidtightly by means of a closure bolt.

FIG. 5 shows a sectional view of the connection body 50, wherein the section plane extends perpendicular to the axis of rotation 11 through the precompression cavities 56. Here, the section plane extends within the second plate-like portion. The four precompression cavities 56 each have substantially the same volume. Their different shaping is due to the first to fourth fluid ducts which should not intersect the precompression cavities. If an individual cylinder bore (No. 43 in FIG. 2) is in the reversal region between the first and the second control kidney (Nos. 41; 42 in FIG. 6), it is connected via the fourth fluid duct (No. 64 in FIGS. 4 and 6) to a precompression cavity 56 which is otherwise closed off fluidtightly. It is thereby possible to considerably minimize the pressure pulsation of the hydraulic machine 30.

It can further be seen in FIG. 5 that the three individual mouth openings (cf. FIG. 4) of the two first fluid ducts 61 are combined within the connection body 50 so as each to form a coherent first fluid duct 61. There can moreover be seen further second fluid ducts 62 for the connection of the control valve (No. 80 in FIG. 1).

Figure 6:
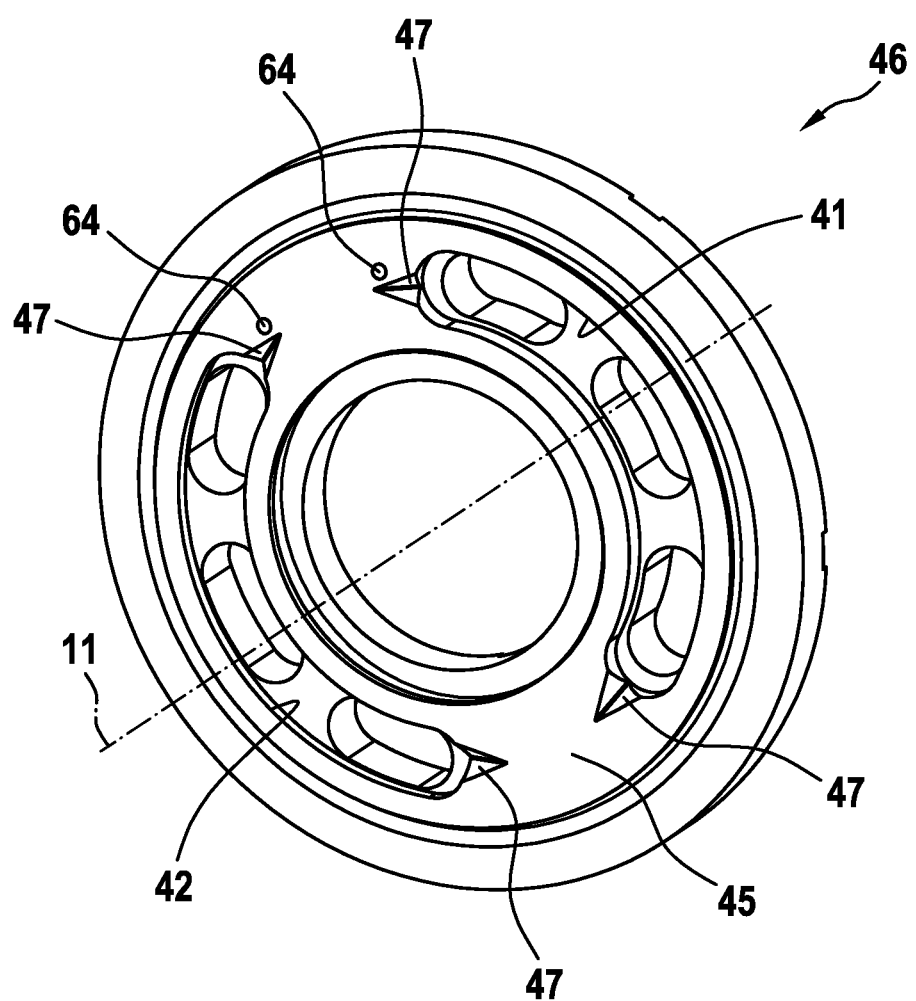
FIG. 6 shows a perspective view of the control plate from the control surface.

FIG. 6 shows a perspective view of the control plate 46 from the control surface 45. In the present case, the control surface 45 is of planar design. In the control surface 45 there are arranged a first and a second control kidney 41; 42 which are each connected to an assigned first fluid duct. The control kidneys 41; 42 each take the form of slot-like cutouts which extend with a circular curvature with respect to the axis of rotation 11. The control plate 46 bears against the connection body 50 in a rotationally fixed manner with respect to the axis of rotation 11.

At the ends of the first and the second control kidney 41; 42 that point in the circumferential direction there is in each case arranged a run-in notch 47 in order to reduce pressure pulsations.

The mouth openings of two fourth fluid ducts 64 can further be seen in FIG. 6. The present control plate thus covers the two other fourth fluid ducts 64 visible in FIG. 4, with the result that they are inactive. The fourth fluid ducts 64 which are used depends on the planned use conditions of the hydraulic machine. If it is used only as a pump with a single direction of rotation, only one fourth fluid duct 64 is required. If the hydraulic machine is used both as a pump and as a motor and for this purpose with a change in direction of rotation, all four fourth fluid ducts 64 are used.

REFERENCE SIGNS

10 Motor-hydraulic machine unit
11 Axis of rotation
20 Electric motor
22 Second drive shaft
30 Hydraulic machine
31 First drive shaft
32 Second rotary bearing
33 Housing part
34 Adjusting mechanism
35 Swivel cradle
36 Open side of the housing part
37 Actuating cylinder
38 Screw bolt
40 Cylinder drum
41 First control kidney
42 Second control kidney
43 Cylinder bore
44 Piston
45 Control surface
46 Control plate
47 Run-in notch
50 Connection body
51 First working connection
52 Second working connection
53 Leakage connection
54 Connection surface
55 Drive aperture
56 Precompression cavity
57 First rotary bearing
58 Cover
59 Screw bolt
61 First fluid duct
62 Second fluid duct
63 Third fluid duct
64 Fourth fluid duct
70 Tube-like portion
71 First plate-like portion
72 Second plate-like portion
73 Third plate-like portion
74 Stiffening rib
75 Sensor bore for pressure sensor
76 Auxiliary bore
77 Aligning bore
78 Sealing ring
80 Control valve
81 Electromagnetic actuator
82 Subsidiary control device

What is claimed is:

1. A motor-hydraulic machine unit, comprising:
an electric motor;
a hydraulic machine; and
a connection body having a planar connection surface that delimits a first working connection and a second working connection, the first and second working connections are each in fluid exchange connection with the hydraulic machine via a respective one of two first fluid ducts in the connection body,
wherein:
the electric motor and the hydraulic machine (i) have a common axis of rotation that is arranged substantially parallel to the connection surface and (ii) are arranged on opposite sides of the connection body in a direction of the axis of rotation,
the connection body is traversed by a drive aperture in the direction of the axis of rotation,
the electric motor and the hydraulic machine are in rotary drive connection in a region of the drive aperture,
the hydraulic machine comprises a cylinder drum having a plurality of cylinder bores in each of which a piston is received in a linearly movable manner,
the cylinder drum bears rotatably against a control surface which has a first control kidney connected to a first one of the two first fluid ducts and a second control kidney connected to a second one of the two first fluid ducts,
at least one separate precompression cavity, which is connected exclusively via a fourth fluid duct to the cylinder bores, is arranged within the connection body, and is closed fluid-tightly, and the fourth fluid duct opens out on the control surface in the circumferential direction between the first and second control kidneys.

2. The motor-hydraulic machine unit according to claim 1, wherein the hydraulic machine has a displacement volume configured to be adjusted by a hydraulic adjusting mechanism, wherein a control valve is in fluid exchange connection with the adjusting mechanism via second fluid ducts that are arranged in the connection body, and wherein the control valve is attached to the connection body.

3. The motor-hydraulic machine unit according to claim 1, wherein a control valve is arranged at an inclination to the axis of rotation such that the control valve does not contact the electric motor.

4. The motor-hydraulic machine unit according to claim 1, wherein the hydraulic machine comprises a housing part, which has a pot-shape having an open side that bears against the connection body in such a way that the open side is completely covered by the connection body.

5. The motor-hydraulic machine unit according to claim 4, wherein the connection body has a third fluid duct having a first end that forms a leakage connection in a region of the connection surface, and wherein the third fluid duct has a second opposite end that leads out into a region of the open side of the housing part.

6. The motor-hydraulic machine unit according to claim 1, wherein the drive aperture is closed fluid-tightly toward surroundings of the motor-hydraulic machine unit.

7. The motor-hydraulic machine unit according to claim 1, wherein:
the hydraulic machine is an axial piston machine of swashplate configuration and further comprises a swivel cradle, and
the cylinder drum is arranged between the connection body and the swivel cradle in the direction of the axis of rotation.

8. The motor-hydraulic machine unit according to claim 1, wherein the hydraulic machine has a first drive shaft, the electric motor has a second drive shaft that is separate from the first drive shaft, and the first and second drive shafts are in rotary drive connection directly or via a separate coupling part.

9. The motor-hydraulic machine unit according to claim 8, wherein the first drive shaft is rotatably mounted with respect to the axis of rotation on a first rotary bearing that is received in the connection body.

10. The motor-hydraulic machine unit according to claim 1, wherein:
the connection body has a first plate-shaped portion and a second plate-shaped portion which are spaced apart from one another in the direction of the axis of rotation, the first and second plate-shaped portions oriented perpendicular to the axis of rotation,
the electric motor is fastened to the first plate-shaped portion and the hydraulic machine is fastened to the second plate-shaped portion, and
the first and second plate-shaped portions are connected to one another in one piece via a tube-shaped portion that delimits the drive aperture.

11. The motor-hydraulic machine unit according to claim 10, wherein at least one stiffening rib is arranged on the outside of the tube-shaped portion and connects the first plate-shaped portion, the second plate-shaped portion, and the tube-shaped portion to one another in one piece, and wherein the stiffening rib extends parallel to, or at an inclination of at most 45°, to the connection surface.

12. The motor-hydraulic machine unit according to claim 10, wherein the connection surface is formed by a third plate-shaped portion that connects the first plate-shaped portion, the second plate-shaped portion, and the tube-shaped portion to one another in one piece.

* * * * *